Feb. 7, 1933. J. GOLDMAN ET AL 1,896,511
FLYING MACHINE
Filed May 11, 1931 3 Sheets-Sheet 1
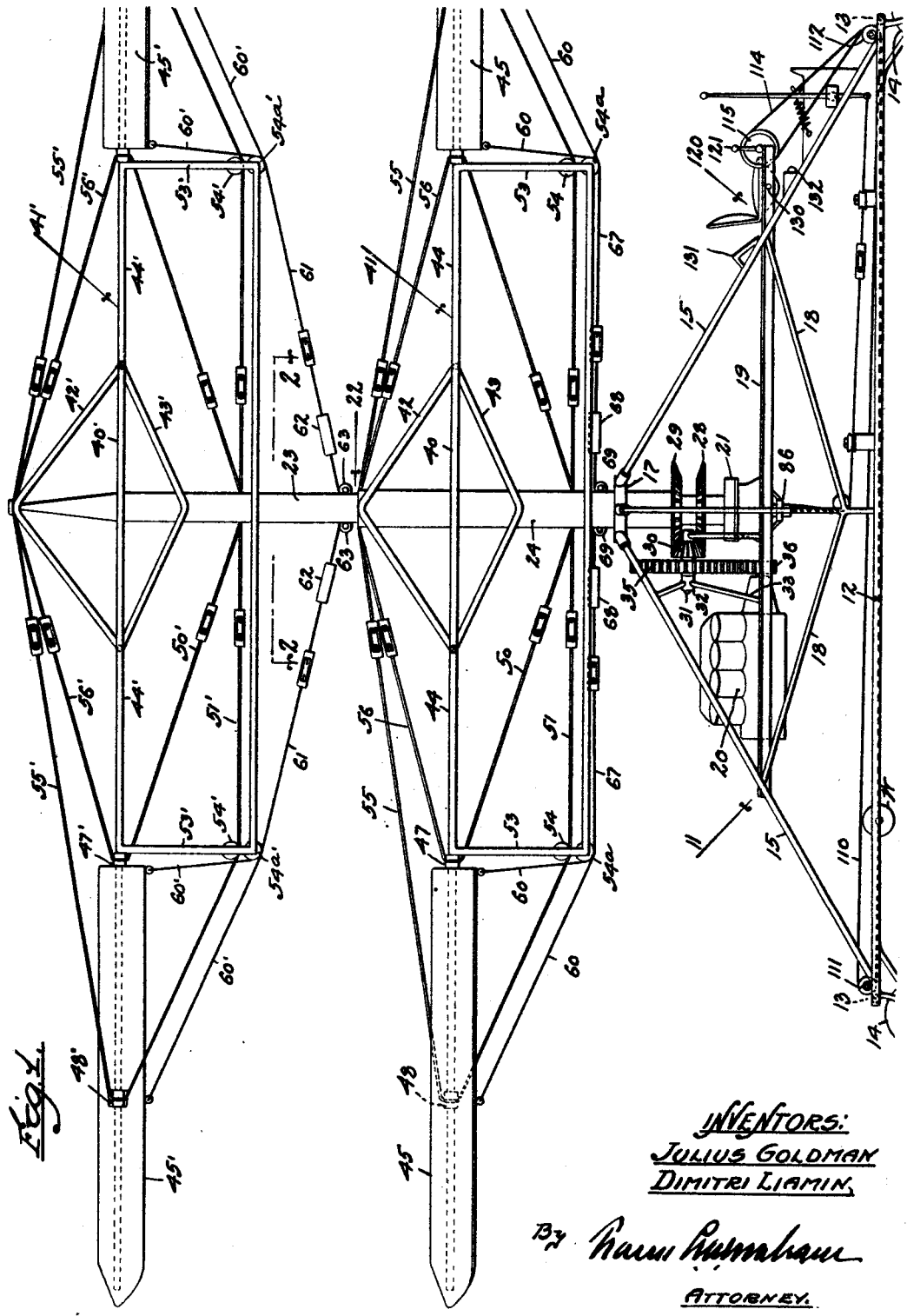
INVENTORS:
JULIUS GOLDMAN
DIMITRI LIAMIN
ATTORNEY.

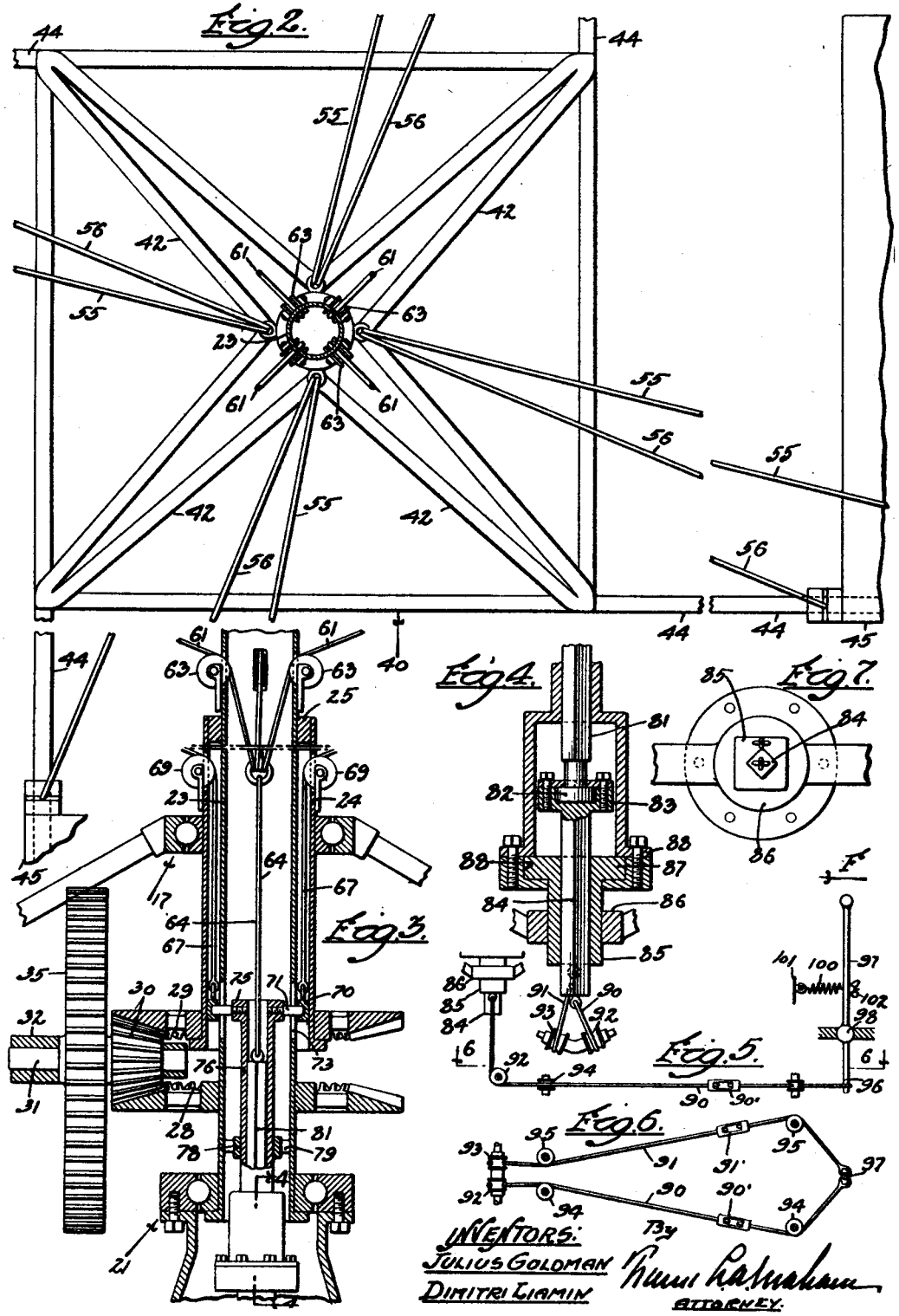

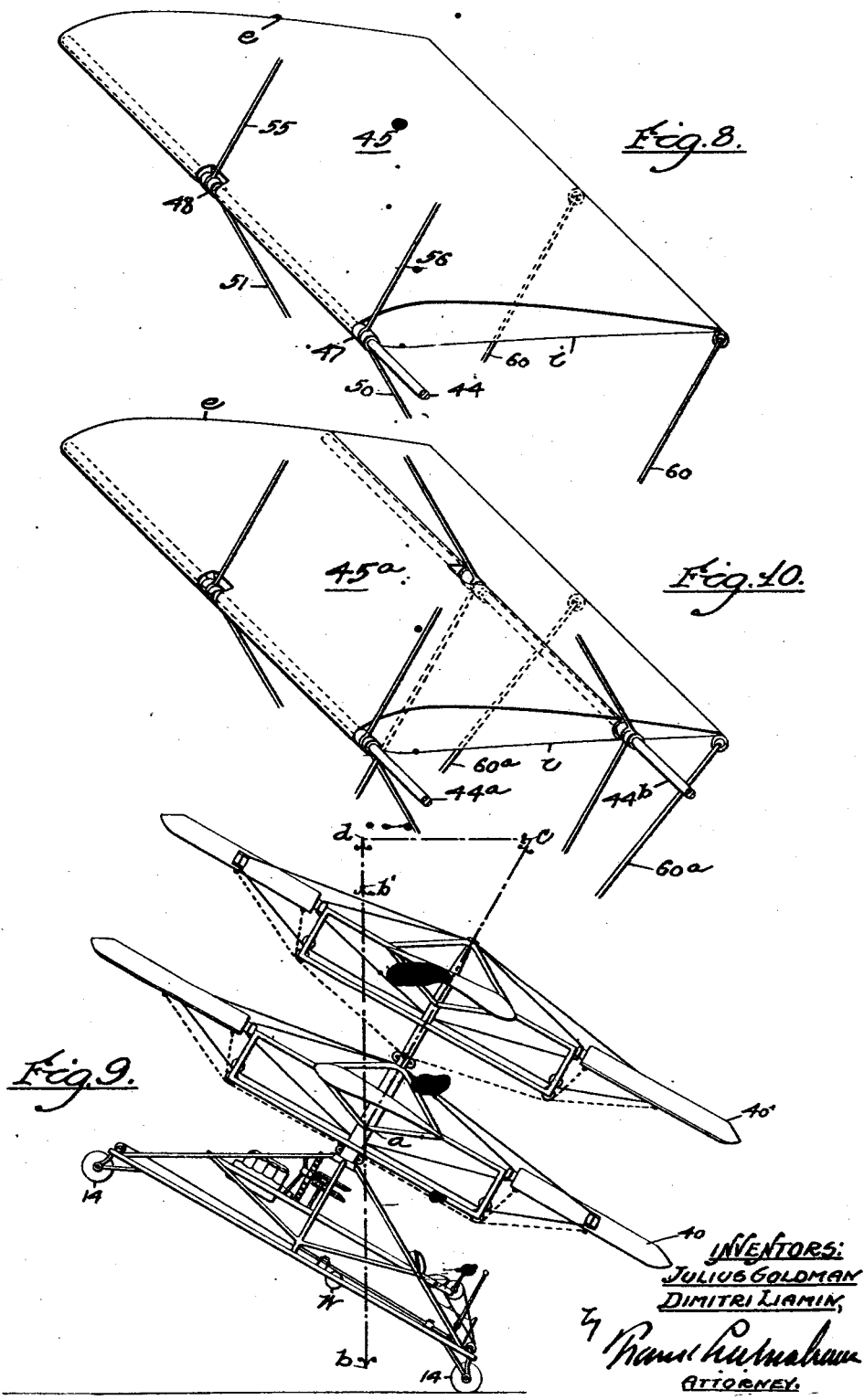

Patented Feb. 7, 1933

1,896,511

UNITED STATES PATENT OFFICE

JULIUS GOLDMAN AND DIMITRI LIAMIN, OF LOS ANGELES, CALIFORNIA; SAID LIAMIN ASSIGNOR TO SAID GOLDMAN

FLYING MACHINE

Application filed May 11, 1931. Serial No. 536,396.

This invention has to do in a general way with that type of heavier than air aircraft ordinarily known as the helicopter, and is more particularly related to improvements in the construction and method of operation of such vehicles which are designed to render them safe to operate and easy to handle and control.

The helicopter classification of aircraft includes all machines which are designed to be lifted and sustained in the air solely by means of rotating air screws. We are aware of the fact that numerous attempts have been made to construct flying machines of this nature and in all of the machines with which we are familiar the designers have attempted to secure the lift by a lift reaction or thrust of propeller blades rather than by air acting on planes or air foils inclined at an angle to the direction of motion of the machine.

In the device contemplated by this invention we have departed from the ordinary construction as outlined above, in that we employ for the lifting means an airplane unit or a pair or plurality of such units, each of which comprises a series or plurality of angularly disposed wings or air foils. These wings or air foils in the construction contemplated by this invention are mounted upon a vertical standard which in turn is mounted in a properly balanced frame structure. Means are provided in the frame structure for rotating the airplane units, such rotation preferably being imparted through the medium of the vertical standard, and in order that there may be no rotative movement of the frame structure relative to the earth, we employ a pair of airplane units which are preferably mounted upon concentric shafts in vertically spaced relation with each other and are associated with the driving means so that the two airplane units are revolved in opposite directions. In order that we may obtain the proper lift or lifting force through the rotation of these airplane units, we construct the individual wings so that their angle of attack or the drag on these wings may be varied. This may be accomplished either by mounting the wings on the shafts in a manner such that they will rotate or swing about substantially horizontal axes, or by rigidly securing the wing members to these shafts and providing them with adjustable ailerons.

It is a further object of this invention to produce an aircraft of the class described with novel means for controlling the movement of the craft in a horizontal plane. This is accomplished by changing the position of the center of gravity of the unit relative to the line of force created upon the unit by the revolving airplanes, and in the preferred form of our invention is accomplished by providing the frame structure with a weight which is associated with means whereby it may be moved longitudinally of the frame structure so as to adjustably vary the center of gravity of the flying machine or flying apparatus. This adjustable weight may also be used in properly balancing the unit as the balance changes due to depletion of the fuel supply, etc.

Although the feature just described above is effective to control the direction of flight between horizontal and vertical planes, it is not sufficient in turning the aircraft or controlling the direction of flight relative to fixed objects on the earth's surface. For the purpose of effecting this guiding movement of the aircraft, we provide means for controlling the angle of attack or the drag in the wings in one airplane unit relative to the angle of attack or drag in the wings of the other airplane unit. In this manner one airplane unit may be made effective to rotate at a greater speed than the other, and consequently, in view of the fact that the two units are operated through a single gear from the same source of power, this results in a differential rotative movement of the frame structure relative to the earth. Consequently, the position of the center of gravity is angularly rotated relative to the axis of the airplane units so that the flying machine in this manner is given a different direction of flight. After the desired line of flight has been secured the angle of attack in the wings in the various units is adjusted so that the ratio of lift to drag in the two units is again the same and the machine follows this course until a further adjustment has been made.

In the event the machine is flying horizontally above the surface of the earth, or in the event it is operating in a wind, it will be observed that the pressure on the various wings will vary as they pass through their course about the axis of the airplane units. In order that this variation in pressure will not be effective to cause a disturbance in the movement of the flying machine, we provide the members which support the outer ends of the wings or the ailerons, (in the event this latter construction is employed) with yieldable means designed to permit a slight swinging movement of the wings as they pass through the regions of different relative air velocity during each rotation.

It is a further feature of the device contemplated by this invention that means are provided for preventing or limiting the upward swinging movement of the wings beyond a predetermined point when they are exerting a lifting force upon the machine. Such means are associated with the mechanism for controlling the angularity or angle of attack of the various wings.

It is a further object of this invention to produce a flying device of the class described, which is constructed so that it will descend at a very slow speed with a dead motor. Due to the airplane type of wings or airfoils, it will be seen that if the wings are permitted to rotate as the machine descends, they have the same effect as a glider or airplane when it is coasting and by adjusting the wings so that they have a negative angle of attack, they will be rotated due to the downward movement of the plane and will be effective to greatly retard the speed of descent. As the machine nears the surface of the earth, the wings may be adjusted so as to present a positive angle of attack and through such adjustment will be effective to still further retard the speed of descent so that the machine may be landed on the earth's surface with negligible shock.

The device contemplated by this invention is of simple form and construction, it may be designed to be operated manually or by a motor.

The details in the construction of a preferred form of our invention, together with other objects attending its production, will be best understood from the following description of the accompanying drawings which are chosen for illustrative purposes only, and in which:—

Fig. 1 is an elevational view showing a preferred form of our invention;

Fig. 2 is a partial plan section illustrating the construction of a preferred form of wing and wing support and may be considered as having been taken in a plane represented by the line 2—2 in Fig. 1;

Fig. 3 is a partial sectional elevation illustrating a preferred system of controlling the angle of attack in the wings of the two airplane units;

Fig. 4 is an enlarged sectional elevation taken in a plane represented by the line 4—4 in Fig. 3;

Fig. 5 is a diagrammatic view illustrating the manner in which the control lever is associated with the wing controlling members or cables;

Fig. 6 is a plan view taken in a plane represented by the line 6—6 in Fig. 5;

Fig. 7 is an inverted plan view of Fig. 4;

Fig. 8 is a perspective view of a preferred form of wing member contemplated by this invention;

Fig. 9 is an elevational view showing a device of the type contemplated by this invention in flight and illustrating the manner in which the machine is operated for propulsion in a horizontal plane; and Fig. 10 is a perspective view of a modified form of wing structure contemplated by this invention.

More particularly describing the invention as herein illustrated, reference numeral 11 indicates a frame structure which is shown as comprising a pair of longitudinal side rails 12, the ends of which are secured to end rails 13 to form a base member which is shown as being provided with wheels 14. Secured to the corners of the base member we provide a plurality of diagonal braces 15, the upper ends of which are secured to a combination thrust and radial bearing 17. Reference numeral 18 indicates a plurality of auxiliary braces which extend from intermediate points on the brace members 15 to intermediate points on the base member 12.

Reference numeral 19 indicates an intermediate frame structure which acts as a support for a motor 20 and a combination thrust and radial bearing 21. Reference numeral 22 indicates what we will hereinafter refer to as a vertical standard which is supported by the thrust and radial bearings 17 and 21, and as shown in Fig. 3, consists of a pair of concentric hollow shafts 23 and 24. The inner shaft 23 has its lower end supported by the thrust and radial bearing 21 and is supported at an intermediate point by a bearing collar 25 which is mounted on the upper end of the outer shaft 24. The outer shaft 24 is supported at an intermediate point by the thrust and radial bearing 17. These two shafts are adapted for rotation in opposite directions, such rotation being effected by means of bevel gears 28 and 29, the former being secured to the inner shaft 23 and the latter to the lower end portion of the outer shaft 24. The bevel gears 28 and 29 are engaged by a pinion 30 which is mounted upon a stub shaft 31 supported in a suitable bearing 32 which in turn is carried by a bracket 33 mounted on the frame 19. The stub shaft 31 also carries a large spur gear 35 which is engaged by pinion 36 mounted on the crank shaft of the motor 20. This pinion may be associated with a spline clutch of any well known type for the purpose of disengaging same in the event it is desired to disengage the motor from the wing or airplane operating mechanism.

Reference numerals 40 and 40' indicate wing supporting frames, each of which forms a part of an airplane unit 41 and 41' mounted on the outer shaft 24 and the inner shaft 23, respectively. The wing supporting frames 40 and 40' are shown as being made square in shape (Fig. 2) and are provided with braces 42 and 42' and 43 and 43'.

Reference numerals 44 and 44' indicate horizontal spar members which project outwardly from the successive corners of the wing supporting frames 40 and are adapted to support the leading edges of wings or airfoils, indicated by reference numerals 45 and 45'. These wings or airfoils may be provided at their leading edges with suitable bearings (not shown), whereby they are supported on the spars 44. Reference numerals 47, 48 and 47', 48' indicate bushings mounted on the spars for the purpose of preventing lateral movement of the wings or airfoils relative thereto.

Reference numerals 50, 50' and 51, 51' indicate stationary adjustable tension wires which are interposed between the spars of the two airplane sections and the corresponding rotatable shafts for the purpose of carrying a part of the load from the shafts to the wing members. It will be noted that the wires 50' extend from the inner edges of the wings 45 to an intermediate point on the inner shaft 23 and that the wires 51 extend from a point preferably situated on the line which passes through the center of pressures of the wings 45 to the same point on the shaft 23. This construction is also followed in the lower airplane unit.

Reference numerals 53 and 53' indicate auxiliary frames which are mounted on the shafts 24 and 23 respectively, so that they have a portion which projects downwardly a substantial distance below the plane of the airplane units 41 and 41' and these auxiliary frames are provided with rollers 54 and 54' over which the wires or cables 51 and 51' are adapted to pass.

Reference numerals 55, 56, and 55', 56' indicate supporting wires or cables which extend from the spar members 44 and 44' to points on the shafts 23 and 24 above the planes of the airplane units.

From the construction so far described, it will be seen that the machine contemplated by this invention comprises a frame structure which supports a vertical standard consisting of two concentric shafts adapted for rotation in opposite directions. Also that each of these shafts carries an airplane unit, the two units being vertically spaced apart and each comprising a series of wings or airfoils which are adapted for swinging movement about their horizontal axes.

As was pointed out in the earlier part of the specification, it is one object of this invention to provide the various wing units with means for adjusting their angle of attack at any time during or prior to the flight of the machine. Such means are shown as comprising wires or cables 60 and 60'. The cable 60' passes over pulleys indicated at 54a', or their equivalent, and are jointed to single cables 61 which contain spring members 62 and which pass over rollers or pulleys 63 into the interior of the upper or inner shaft 23 where they are joined to a single main control cable 64. The cables 60 pass over rollers 54a or their equivalent and are joined to a single cable 67 which contains a spring member 68 and which passes over rollers 69 into the space between the inner and outer rotatable shafts.

It is of course necessary, in properly transmitting the movement of these two cables through the rotating shaft so that they may be operated, to bring the outer cables 67 into the inner shaft 23. This operation must be effected without twisting or turning the cables and although various means may be employed for doing this, we show in Fig. 3 a preferred form of construction wherein the cables 67 are attached to a hollow ring 70 which receives the ends of a series of spokes or arms 71 which pass through slots 73 in the inner tube or shaft 23. The inner ends of these spokes 71 are secured to a hub member 75 which is mounted on the upper end of a sleeve 76. The sleeve 76 is supported in the inner pipe by means of a hub 78 which is supported by ribs 79 formed or secured in the lower end portion of the inner pipe 23.

It will be seen from the construction described so far that the sleeve 76 and its associated parts, including the hollow collar 70, are adapted for longitudinal movement in the pipe 23. The cable 64 has its lower end portion secured to a square plunger 81 which is slidably mounted in a correspondingly square passage through the sleeve 76 and has a head member 82 formed on its lower projecting end, such head member being received in a cap or cup 83 which is formed on the upper end of a stationary plunger 84. The stationary plunger 84 is made polygonal in cross section and is adapted to slide through a sleeve 85 which in turn is slidably mounted in a bearing ring 86 secured to the supporting frame 19. The upper end portion of the sleeve member 85 is provided with a head 87 which is received in an annular cup or recess 88 formed in the lower end portion of the sleeve member 79. From this construction it will be seen that both the cable 64 and the system of cables 67 may be moved longitudinally relative to each other from a source of power applied externally of the pipe. This movement may be effected through the medium of control cables 90 and 91 which are attached to the lower end portion of the sleeve 85, respectively. These cables pass over pulleys 92 and 93 from which they diverge, as indicated in Fig. 6, to pass over pulleys 94 and 95, after which they are led to the lower end portion 96 of a control lever 97. The control lever 97 is provided with a ball and socket support 98 which permits universal movement of this lever, and the cables 90 and 91 are preferably provided with turn-buckles 90' and 91' for the purpose of adjusting their length and consequently controlling the angular position of the wing members in the two units relative to each other for any one setting of the control lever.

It will be apparent to those familiar with the art that during the rotation of the two airplane units the lift exerted on the wings of these units will create a torque in the wings about a lever arm extending from the spars to the center of pressure in the wings which tends to rotate or swing the wings into vertical positions. For the purpose of limiting the upward movement of the wings in this manner, we provide the lever member 97 with a tension spring 100 which is secured to a fixed part of the frame, as indicated at 101, and is provided with an adjustment 102 for controlling the effect of this spring upon the lever member and its associated parts.

It will now be observed that as the wing members rotate upwardly about their horizontal axes, they will first take up any slack in the wing control cables and after a predetermined pressure has been reached will place the spring 100 under tension. This spring is made of a character such that its tensile strength is sufficient to carry the force transmitted to the lever member from the wings under normal lifting conditions, so that the only force which must be applied to the lever member in the direction of the arrow F for the purpose of controlling the movement of the machine, is that necessary to change the angle of attack of the wings; in other words, the pressure exerted upon the wings in lifting the machine is equalized by the spring 100.

The purpose of arranging the wires 90 and 91 with respect to the guide pulleys 94 and 95 and the lower end of the control lever 96 in the manner shown in Fig. 6 and making the lever member so that it is adapted for universal movement, is to permit or to effect the adjustment of the angle of attack in the wings of the two airplane units so that the angle in the wings of one unit may be changed relative to the angle in the wings of the other unit. This, as pointed out above, is for the purpose of causing a rotative movement in the frame structure 11, and is used in guiding the machine when it is in flight.

For the purpose of changing the course of the machine from vertical to horizontal, or from vertical to a combination of vertical and horizontal, we provide the frame member with a weight W which is shown as being mounted upon a cable 110 which passes over pulleys 111 and 112 mounted on the end bars or rails 13. The movement of this cable is controlled by an auxiliary cable or by passing a section 114 of the same cable over a pulley 115 which is mounted adjacent the pilot seat 120 and is provided with a crank 121. From Fig. 9 it will be observed that when the weight W is shifted to a position such that the center of gravity acts vertically downward in the general direction of the line A—B, that the flying machine will assume a position such as that shown. Assuming the force exerted by the revolving airplane units 40 and 40' to be represented by the line A—C and to be commensurate with the length of this line, it will be observed by resolving the force A—C into its two components A—D and D—C, that there is a resultant force D—C tending to move the plane horizontally, and where the force of gravity is represented by the line A—B', it will be seen that there is also a force B'D which exerts a lifting movement on the flying machine. By properly adjusting the angular relation of the machine with respect to the pull of gravity and by adjusting the power supplied through the motor 20, it will be seen that the machine may be flown in a straight line parallel to the surface of the earth; it may be flown in a general direction along the surface of the earth and in a direction upward therefrom or downward toward the earth.

It will also be observed that if the weight W is adjusted so that the center of gravity lies vertically below the axis of the standard 22, that the machine may, by driving the airplane units at a comparatively slow speed, be made to hover over one point. It may, on the other hand, be made to rise vertically from one point or descend vertically toward that point. The construction of the airplane units in the manner shown also permits the descent of the machine when the motor is dead, such descent being at such a slow rate of speed that a safe landing can be made.

As pointed out above, if the wings are adjusted so as to have a negative angle of attack during the descent of the machine and are readjusted when the machine nears the surface of the earth so as to have a positive angle of attack, the inertia of the wings will bring the apparatus to a standstill, making the landing very smooth.

In constructing a machine of this character we find it preferable to mount the pilot seat 120 upon a shaft 130 so that the seat will remain substantially horizontal at all times irrespective of the angle assumed by the machine. Reference numerals 131 and 132 indicate stops which may be provided for the purpose of preventing the seat tipping clear over in the event the pilot should shift his weight beyond the proper point of balance.

In Fig. 10 we show a modified form of wing construction wherein the wing member 45a is rigidly mounted on spar members 44a and 44b. The resistance or effective "angle of attack" of the wing 45a is controlled by means of an aileron 140 which is attached to the wing section in the usual manner and is adapted to be operated by means of the cables 60a. It will be observed that this construction will be effective to control the movement of the machine in the same manner as the wing shown in Fig. 8.

It will be apparent from the foregoing description that the device contemplated by this invention is of simple form and construction and may be easily controlled or handled while in flight.

The following theoretical analysis demonstrates the practicability of the machine and is illustrative of the manner in which the machine may be designed for any desired weight and motive power:

Let us assume that an airfoil such as the wing section 45 (Fig. 8) having an area A rotates about a vertical axis such as the axis of standard 22. If the airfoil were moving horizontally and straight forward at a speed of V miles per hours and have by an assumed angle of incidence Y a lifting co-efficient K, the lifting power of this airfoil may be calculated as $$L = (V^2 \cdot A \cdot K)$$

If, however, the airfoil is rotating about its vertical axis in the same horizontal plane and has the same angle of incidence Y, the relative speed at the external end $e$ of the airfoil will be greater than at the internal end $i$. Consequently, the lifting power along the airfoil will be variable and the total lifting power when the airfoil is rotating at a speed of $n$ R. P. M. may be found by integrating the following equation where $K_L$ is the lift co-efficient.

$$L = \int_a^b K_L \times (cdx) \times V^2$$

$$\text{From } V = \frac{\pi \times (2x) \times n}{88}$$

$$\text{We obtain } V = \frac{x \times n}{14} \text{(m.p.hr.)}$$

$$\text{Then } L = \int_a^b K_L \times (cdx) \times \left(\frac{xn}{14}\right)^2$$

$$= \frac{cxK_L xn^2}{156} \int_a^{b^2} xdx$$

$$= \frac{c \times K_L \times n^2}{156 \times 3} \Big|_a^{b^3} x$$

$$= \frac{c \times K_L \times n^2}{468}(b^3 - a^3) \quad (a)$$

The power required to rotate this wing about the vertical axis at $n$ R. P. M. depends upon the drag coefficient of the selected airfoil.

This drag may be expressed by the equation $$D = V(\text{average}) \cdot A \cdot K_d$$

where $K_d$ is the drag coefficient.

An airfoil having an area A traveling through undisturbed air at a rate of $n$ R. P. M. and lifting L pounds will require $$\frac{D \cdot V (\text{average})}{375 \cdot p} = \text{horse power}$$

where $p$ is the mechanical efficiency.

Equation (a) can be rewritten as follows:

$$L = \frac{c \times K_L \times n^2}{468}(b^3 - a^3)$$

$$= [(b-a)c] \times K_L \times \frac{n^2}{468}(a^2 + b^2 + ab)$$

$$= A \times K_L \times \left(\frac{n}{21.6}\right)^2 \times (b^2 + a^2 + ab)$$

But $L = A \times K_L \times V^2$ $$\text{Therefore } V = \sqrt{\left(\frac{n}{21.6}\right)^2 \times (b^2 + a^2 + ab)}$$

The power required to revolve the wing at a speed of $n$ R. P. M. about its axis may be expressed as $$\text{H. P.} = \frac{L \times \frac{Kd}{K_L} \times V(\text{aver.})}{375 \times p}$$

$$= \frac{c \times K_L \times n^2(b^3 - a^3) K_d \times \sqrt{\left(\frac{n}{21.6}\right)^2(b^2 + a^2 + ab)}}{468 \times K_L \times 375 \times p}$$

$$= \frac{c \times n^3(b^3 - a^3) \times K_d \times \sqrt{b^2 + a^2 + ab}}{p \times 3,790,000}$$

If, however, the airfoil, discussed above, in its process of rotation were followed by an identical airfoil, the latter would travel through disturbed air, that is, a stream of air entrained by the motion of the first airfoil. This disturbance will have a curved course of motion (trachoidal—vertical and cubic parabolic horizontally) and will vary inversely with the radius of rotation and directly with the R. P. M. and the number of airfoils rotating in a single plane. This explains why the lifting capacity of a rotating wing after reaching a certain critical speed will not increase the lifting power with a further increase in speed.

The law governing the interference discussed above might be expressed in a combination of several complex equations coordinating the several unknown quantities as mentioned above. It is, however, not the object to further complicate the present analysis. The double differentiation of those equations give the maxima for L and the minima for H. P. required as well as corresponding values for $a$, $b$, $v$, A, angle of incidence $y$ and R. P. M. ($n$).

For example it might be found that the minimum horse power required to lift a load of 400 pounds amounts to ½ H. P., or that an average man weighing 150 pounds being able to deliver one-half horse power for a short period of time could lift himself and the apparatus weighing 250 pounds. Such results might be obtained using modern airfoils having a ratio of K to $K_d$ of 25, and angle of incidence $y=40$. Under the same conditions out changing the angle of incident ($y$) to 5½° the required horse power will amount to 3¼ H. P. In other words to lift a certain load with a minimum power requirement, it is necessary to have the remainder of the values properly balanced. The parasite drag inevitable in any flying apparatus is, in our case reduced to a minimum.

In the operation of our invention, the forward movement of the apparatus, as pointed out above, is actuated by changing the center of gravity of the entire unit. The two sets of wings are for the purpose of counteracting the torque arising from the drag resistance. Practically it is impossible to accurately balance the drag resistance of the two sets of wings, consequently we provide means for varying the angle of attack in one set of wings relative to the angle of attack in the other set of wings as explained above. When the apparatus is tilted the last mentioned means (swinging wings and associated parts in Fig. 8, and ailerons in Fig. 10) act as a horizontal rudder.

It is to be understood that while we have herein described and illustrated one preferred form of our invention, the invention is not limited to the precise construction described above, but includes within its scope whatever changes fairly come within the spirit of the appended claims.

We claim as our invention:

1. A flying apparatus of the class described embodying: a pair of airplane units each comprising a plurality of wings; means for supporting said airplane units in vertically spaced relation with each other; means for rotating said units in opposite directions; and means including a single control for adjusting the angle of attack of the wings of both units and for varying the angle of attack of the wings in one unit relative to the angle of attack of the wings in the other unit.

2. A flying apparatus of the class described embodying: a pair of airplane units each comprising a plurality of wings; means for supporting said airplane units in vertically spaced relation with each other; means for rotating said units in opposite directions; and means including a single control for adjusting the angle of attack of the wings of both units and for varying the angle of attack of the wings in one unit relative to the angle of attack of the wings in the other unit.

3. A flying apparatus of the class described embodying: a pair of airplane units each comprising a plurality of wings; means for supporting said airplane units in vertically spaced relation with each other; means for rotating said units in opposite directions; ailerons on the wings in said units; and means including a single control for adjusting the angle of attack of the wings of both units and for adjustably varying the angle of incidence of the ailerons in one unit relative to the angle of incidence of the ailerons in the other unit.

4. A flying apparatus of the class described embodying: a pair of airplane units each comprising a plurality of wings; means for supporting said units in vertically spaced relation; means for driving said units in opposite directions; and means including a single manual control for varying the drag in said units in uniform and in non-uniform relation with each other.

5. A flying apparatus of the class described embodying: a frame structure; a substantially vertical standard rotatably mounted in said frame structure, said standard comprising a pair of concentric shafts one of which extends through and beyond the other; means for rotating said shafts in opposite directions; an airplane unit comprising a plurality of wings mounted on each of said shafts; means including a single control for adjusting the angle of attack of the wings of both units and for varying the angle of attack in the wings of one unit relative to the angle of attack in the wings of the other unit; and means for adjustably varying the center of gravity of said flying apparatus.

6. A flying apparatus of the class described embodying: a frame structure; a substantially vertical standard mounted in said frame structure, said standard comprising a pair of concentric shafts one of which extends beyond the other; means for rotating said shafts in opposite directions; a set of substantially horizontal angularly disposed spar members mounted on each of said shafts; wings adjustably mounted on said spar members at the leading edges of said wings; means for limiting the swinging movement of said wings on said spar members; and means for adjustably varying the center of gravity of said flying apparatus.

7. A flying apparatus of the class described embodying: a frame structure; a substantially vertical standard mounted in said frame structure, said standard comprising a pair of concentric shafts, one of which extends beyond the other; means for rotating said shafts in opposite directions; an airplane unit mounted on each of said shafts one above the other, each of said units comprising a plurality of wings swingable about horizontal axes; means for swinging said wings comprising a control lever mounted in the frame structure and flexible members connecting said control lever with said wings; and spring means attached to said lever for limiting the upward swinging movement of said wings when a lifting force is applied thereto.

8. A flying apparatus of the class described embodying: a frame structure; a substantially vertical standard mounted in said frame structure, said standard comprising a pair of concentric shafts, one of which extends beyond the other; means for rotating said shafts in opposite directions; an airplane unit mounted on each of said shafts one above the other, each of said units comprising a plurality of wings swingable about horizontal axes; means for swinging said wings comprising a control lever mounted in the frame structure and flexible members connecting said control lever with said wings; and yieldable means in said flexible members for permitting relative movement of the wings in each airplane unit during the rotation of said units.

9. A flying apparatus of the class described embodying: a frame structure; a substantially vertical standard mounted in said frame structure, said standard comprising a pair of concentric shafts, one of which extends beyond the other; means for rotating said shafts in opposite directions; an airplane unit mounted on each of said shafts one above the other, each of said units comprising a plurality of wings swingable about horizontal axes; and means for swinging said wings comprising a control lever mounted in said frame structure, flexible wing control means attached to said wings, a main wing control cable attached to the said flexible means for each airplane unit, and means connecting said main control cables to said control lever.

10. A flying apparatus of the class described embodying: a frame structure; a substantially vertical standard mounted in said frame structure, said standard comprising a pair of concentric shafts, one of which extends beyond the other; means for rotating said shafts in opposite directions; an airplane unit mounted on each of said shafts one above the other, each of said units comprising a plurality of wings swingable about horizontal axes; and means for swinging said wings comprising a control lever mounted in said frame structure, flexible wing control means attached to said wings, a main wing control cable attached to the said flexible means for each airplane unit, and means connecting said main control cables to said control lever, said control lever being adapted for universal movement so as to vary the tension applied to said main control cable connecting means.

11. A flying apparatus of the class described embodying: a frame structure; a substantially vertical standard mounted in said frame structure, said standard comprising a pair of concentric shafts, one of which extends beyond the other; means for rotating said shafts in opposite directions; an airplane-unit mounted on each of said shafts one above the other, each of said units comprising a plurality of wings swingable about horizontal axes; means for swinging said wings comprising a control lever mounted in said frame structure, flexible wing control means attached to said wings, a main wing control cable attached to the said flexible means for each airplane unit, and means connecting said main control cables to said control lever; and a spring member attached to said control lever for limiting the upward swinging movement of said wings.

In testimony whereof, we have hereunto set our hands at Los Angeles, California, this 5th day of May, 1931.

JULIUS GOLDMAN.
DIMITRI LIAMIN.